No. 783,762. PATENTED FEB. 28, 1905.
G. A. STAHL.
SHAFT KEY.
APPLICATION FILED MAR. 17, 1904. RENEWED JAN. 12, 1905.
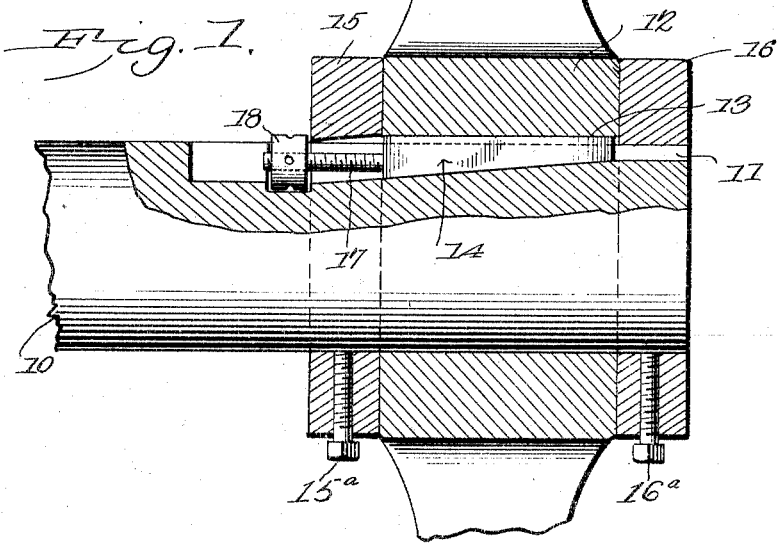
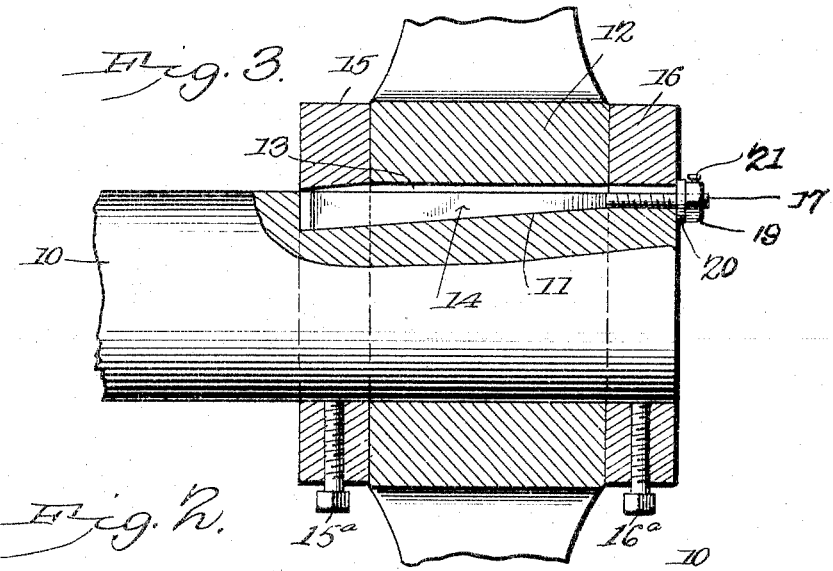
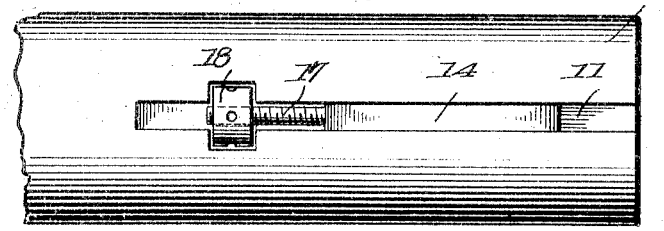
Witnesses
Grant A. Stahl, Inventor.

No. 783,762.

Patented February 28, 1905.

UNITED STATES PATENT OFFICE.

GRANT A. STAHL, OF VENEDOCIA, OHIO.

SHAFT-KEY.

SPECIFICATION forming part of Letters Patent No. 783,762, dated February 28, 1905.

Application filed March 17, 1904. Renewed January 12, 1905. Serial No. 240,832.

*To all whom it may concern:*

Be it known that I, GRANT A. STAHL, a citizen of the United States, residing at Venedocia, in the county of Van Wert and State of Ohio, have invented a new and useful Shaft-Key, of which the following is a specification.

This invention relates to devices for connecting wheels and the like to shafts, and has for its object to provide a simply-constructed and easily applied and operated device whereby the member to be fastened may be rigidly connected to the shaft or permitted to rotate freely thereon, as required.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, there is illustrated a preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a sectional view of a portion of a shaft and the hub portion of a wheel with the improved device connected therewith, showing key member in locked position. Fig. 2 is a view in plan of the shaft and key member shown in Fig. 1 with the other parts omitted. Fig. 3 is a view similar to Fig. 1, illustrating a modification in the construction.

The shaft 10 is provided with a keyway 11 somewhat longer than the hub 12 of the member which it is designed to support upon the shaft and inclined longitudinally of the shaft. The hub 12 is likewise provided with a keyway 13 for registration with the keyway 11. Fitting the keyway 11 is a key 14, having its inner side inclined to correspond to the same, the keyway being of sufficient depth and length to inclose the entire key when in its withdrawn position, and thus release the hub 12 and permit it to rotate freely upon the shaft, and when in its projected position, as shown in Fig. 1, the key will engage the keyway 13 in the hub 12 and firmly lock the same to the shaft. The shaft 10 will preferably be provided with rigid stop-collars 15 16 to guide the hub 12 when in its rotative position and prevent its movement longitudinally of the shaft, said collars being detachably secured upon the shaft by set-screws or bolts 15ª and 16ª.

Extending from one end of the key member 14 is a threaded stud 17, having a nut 18 thereon. The keyway 11 is provided with a transverse recess 19 intermediately of its length, and preferably contiguous to the inner face of the collar 15, in which the nut 18 fits rotatively and bears by its side faces against the walls of the recess. By this arrangement it will be obvious that the rotation of the nut will move the key member 11 along the keyways and either withdraw it from the hub and permit the latter freely to rotate upon the shaft or to lock the hub to the shaft, according to which direction the nut is rotated. The nut 18 is shown with radial apertures to receive a pin-wrench; but a square or hexagonal nut may be employed, if preferred.

By this means it will be obvious that a very simply constructed and easily applied and operated device is produced whereby a wheel or other member may be rigidly connected to the shaft or permitted to rotate thereon, as required, and will be found of great advantage in many localities and for many purposes.

In Fig. 3 a modified form of the arrangement is shown, consisting in locating the threaded stud upon the outer end of the key member 14 and arranging the nut 19 to bear upon the outer end of the shaft; but the operation and result produced are substantially the same as in the arrangement shown in Figs. 1 and 2 and will not be a departure from the principle of the invention. If desired, a washer 20 may be interposed between the nut 19 and the shaft, and, further, a set-screw 21 may be combined with the nut 19. In the form of invention thus described when it is desired to allow the wheel to rotate freely upon the shaft the nut 19 is loosened and by a slight blow upon the end of the key 14 the latter will be caused to drop into the keyway 11, and thus free it from engagement with the keyway of the hub of the wheel.

Having thus described the invention, what is claimed is—

1. In a fastening device of the class described, a shaft having a keyway inclined to the longitudinal plane of the same, a member to be fastened mounted upon said shaft and having a keyway for registration with the keyway in the same, a key having one side inclined to correspond to the inclined keyway in the shaft for adjustable engagement in said registering keyways, and provided with an integral threaded stud extending in longitudinal alinement therewith, and a nut for engaging said stud and bearing against the shaft.

2. In a fastening device of the class described, a shaft having a keyway inclined to the longitudinal plane of the same and with a transverse recess intermediately of the keyway, a member to be fastened mounted upon said shaft and having a keyway for registration with the keyway in the same, a key having one side inclined to correspond to the inclined keyway in the shaft for adjustable engagement in said registering keyways, and provided with an integral threaded stud extending in longitudinal alinement therewith, and a nut for engaging said stud and bearing against the shaft within said recess.

3. In a fastening device of the class described, a shaft having a keyway inclined to the longitudinal plane of the same, a member to be fastened mounted upon said shaft and having a keyway for registration with the keyway in the same, a key having one side inclined to correspond to the inclined keyway in the shaft for adjustable engagement in said registering keyways and adapted to be withdrawn entirely within said inclined keyway, said key being provided with a threaded stud extending from one end, and a nut for engaging said stud and bearing against said shaft.

In testimony that I claim the foregoing as my own I have hereto affixed my signature in the presence of two witnesses.

GRANT A. STAHL.

Witnesses:
 WEBB. WATKINS,
 W. C. LAWRENCE.